E. BURHORN.
COOLING TOWER.
APPLICATION FILED MAY 3, 1919.

1,394,605.

Patented Oct. 25, 1921.

INVENTOR
Edwin Burhorn,
BY
Rogers, Kennedy &
Campbell, ATTORNEYS.

UNITED STATES PATENT OFFICE.

EDWIN BURHORN, OF HOBOKEN, NEW JERSEY.

COOLING-TOWER.

1,394,605.  Specification of Letters Patent.  Patented Oct. 25, 1921.

Application filed May 3, 1919. Serial No. 294,551.

*To all whom it may concern:*

Be it known that I, EDWIN BURHORN, a citizen of the United States, residing at Hoboken, in the county of Hudson and State of New Jersey, have invented certain new and useful Improvements in Cooling-Towers, of which the following is a specification, reference being had therein to the accompanying drawing.

This invention is a novel cooling tower, that is to say, an apparatus wherein the cooling effect of currents of atmospheric air is utilized to lower the temperature of water distributed at the top and passed through the tower by gravity and drawn off at the base in its cooled condition for use, for example in a condenser of a power plant.

The main object of the present invention is to increase the efficiency of cooling towers, more especially by improving the uniformity of distribution of the water descending through the tower. The further and more particular objects and advantages will be made clear in the following description or will be obvious to those skilled in the art. To the attainment of such objects and advantages, the present invention consists in the novel cooling tower shown and described and the novel features of structure, combination, arrangement, and detail therein.

Figure 1:
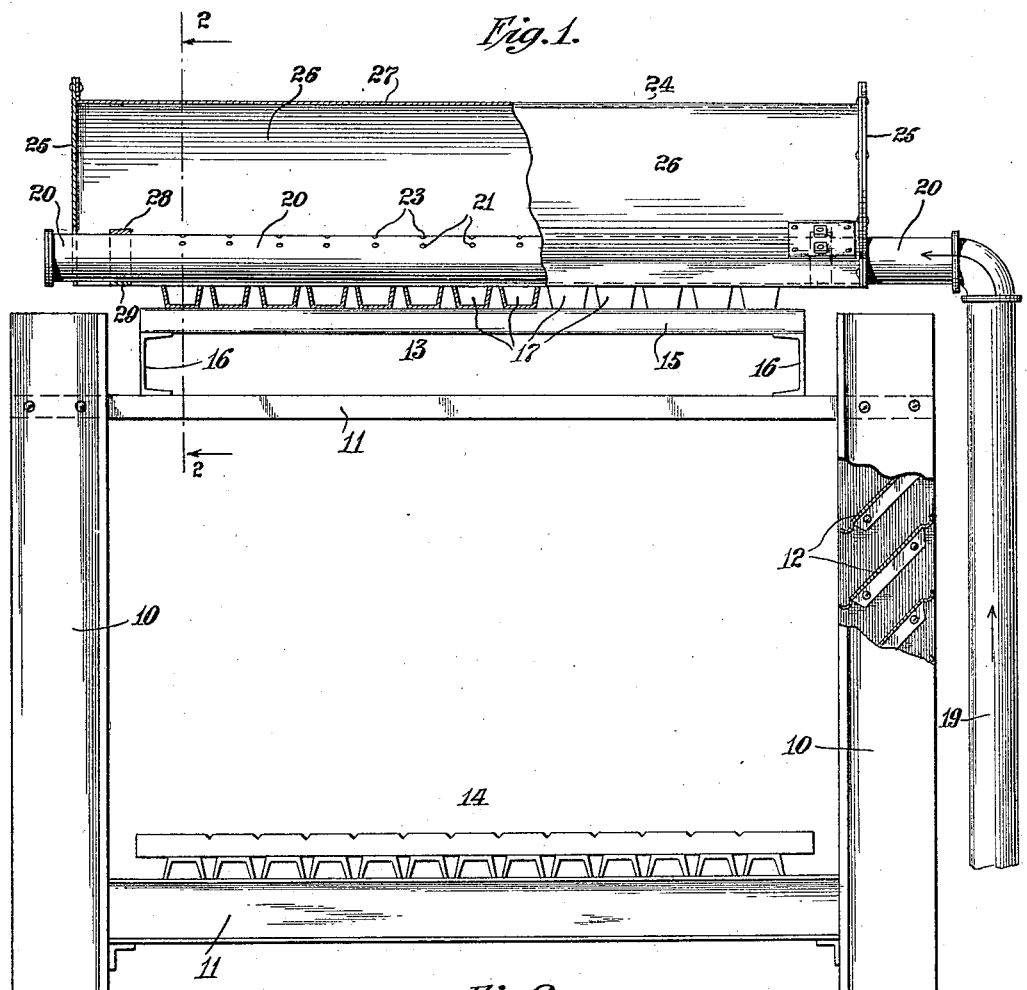

In the accompanying drawings showing a suitable example of the principles of the present invention, Figure 1 is a side elevation of the upper part of the cooling tower, showing the initial water distributing means above the topmost deck.

Figure 2:
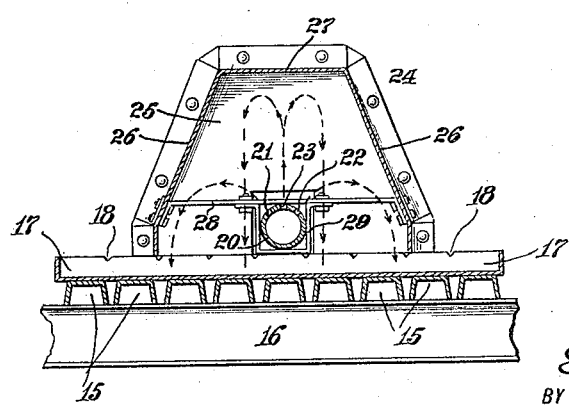

Fig. 2 is a vertical section on the line 2, 2 of Fig. 1, showing the distributing action above the first deck.

According to the present invention, a novel distributing means is employed, located above the upper deck of the tower, the same having two or more rows or series of laterally directed jets or streams of water so that good uniformity is secured in the distribution of the water over the length and breadth of the topmost deck. More particularly, I employ at the upper deck a series of distributing troughs of the same general nature as those shown in prior patents of mine, for example Patent No. 1,287,630, granted December 17, 1918. Above these and transversely to the length of the trough is the distributer pipe having at least two and preferably more than two series of apertures, so that above each trough are produced two or more jets of water, which is thus fed at spaced apart points into each trough. The water level throughout each trough will thus be maintained more uniform and the overflow will occur satisfactorily uniformly throughout the length of each trough. As the apparatus is supposed to operate in natural currents of air, the transversely spreading jets of water above each trough are liable to be diverted by the wind so as to fall outside instead of within the trough, and, therefore, with the combined elements I have provided means to insure that each jet will be delivered into its trough, it consisting of a wind shield or shields such as to prevent laterally blowing winds from undesirably diverting the jets.

Referring to the drawings, the tower framework may consist of uprights 10 and suitable cross-pieces or braces 11, for example at each deck level. Frequently it is desirable to surround all the sides of the tower by a series of louvers 12 which tend to give a more desirable direction to the air flow inside the tower. The drawing shows an upper deck 13 and a lower deck 14, and there may be further similar decks therebelow so that the descent of the water is delayed and broken up and the water redistributed at each deck before passing on. The decks below the upper deck 13 may be somewhat similar and need not be specifically described. The upper deck is shown as comprising a series of inverted channels 15 carried at their ends on supporting channels 16. The inverted channels 15 are spaced slightly apart so that the distributed water may descend between them.

Carried upon the channels 15 are a series of troughs 17. These are preferably parallel and may be suitably spaced according to desired conditions.

The general plan of a tower of this nature is to maintain a distribution or feed of water into all of the series of troughs 17, and these troughs are arranged in a suitable manner, for example, by notches 18, to overflow at spaced apart points, giving relatively small streams of water which pass downwardly over the whole length and breadth of the tower. As seen in Fig. 2, each of the notches 18 is above one of the spaces between two of the inverted channels 15. In addition to the multitude of small streams thus produced, there is a constant splashing and dripping between the troughs and channels at the upper deck and each deck beneath, so that the water at all times is being constantly subjected to the action of evaporation and direct contact with natural currents of air passing through the tower.

The distributer of the present invention is located above the parallel series of troughs 17 at the upper deck. An advantage of the present invention is that a single distributer pipe may be employed, giving simplicity in operation, ease of maintenance, better equality of distribution, and lower first cost. The upwardly extending feed pipe 19 is shown connected by an elbow to the single horizontal distributer pipe 20 of this invention. These pipes may have suitable additional supporting means besides those to be described.

The distributer pipe 20 hereof is shown as extending transversely, that is at right angles to the direction of the troughs, which, as below seen, may be located directly beneath the distributer pipe.

Two or more series of apertures and jets are shown at the upper side of the distributer pipe 20. The apertures 21 are directed laterally to one side and the apertures 22 laterally to the other side, each having an inclined upward direction so that the stream or fountain of water issuing from each aperture will constitute a fountain, spout or jet, that will carry to a substantial distance toward the ends of each trough. Fig. 2 diagrammatically shows the path of each water fountain or jet. In addition to the lateral jets there may be a vertical jet issuing through the central series of apertures 23, the water therefrom descending at each side of the distributer pipe into the middle part of the trough beneath.

Thus, a distributing means is provided which furnishes water to each trough, and in each trough furnishes the water not merely to one point, tending to produce unevenness of distribution and overflow, but at a plurality of spaced-apart points, namely, near the middle and near the ends. Thereby the water will tend to overflow uniformly from the notches 18 at both sides and throughout the length of each overflow trough 17.

The apparatus as a combination of elements is completed by coöperating means to insure that each jet will deliver properly into its trough, notwithstanding diverting influences of wind. A wind shield device 24 is to this purpose provided. While this might take different forms, I have shown the same in the form of an inverted box of sufficient length to encompass all of the water jets and of sufficient height and width to avoid impeding the jet or fountain action as shown in Fig. 2. As I prefer to protect the jets from all directions of wind, the same is shown as having end walls 25, 25, opposite side walls 26, 26, and a top wall 27 suitably constructed of durable material such as iron plates riveted together. This shield structure may rest upon the edges of the troughs 17, as shown, and may be also bolted into proper association with the distributer pipe 20. To this purpose the shield is provided internally, near its end, with a cross-bar 28 bolted to the opposite sides and resting directly upon a part of the distributer pipe. In association with the cross-bar 28 is a bent underhanging bar or stirrup 29 constituting a U-shaped clamp snugly surrounding and contacting the distributer pipe.

The wind shield 24 is shown open at the bottom so that the water fountain action and other features of the water flow occur without interference. The troughs may be and are shown extending beyond the wind shield at their ends. This permits a smaller wind shield. The generally outward or spreading action of the water jets 21 and 22 tends to cause flow toward trough ends, thus insuring that sufficient water will reach the notches externally of the wind shield. From the fact that the main part of each trough is protected from wind and, in a sense, even the external parts, there is prevented any tendency by the wind to cause a general flow of the water in the troughs either toward one end or toward one side. A uniform overflow level is thus assured, giving an effective and uniform distribution from the topmost deck of the tower, so that the efficiency of the tower is much enhanced as compared with any initial distribution which permitted the water to descend generally toward one side or one end of the tower.

It will thus be seen that I have described a cooling tower operating upon the principles and containing the advantages of the present invention. Since many matters of combination, arrangement, dimension, design, and detail may be variously modified without departing from the principles of the improvement, there is no intention of limiting the invention to such features except in so far as set forth in the appended claims.

What is claimed is:

1. In a cooling tower wherein the descending water is subject to direct contact with natural currents of air, the combination with a tower framework, a series of distributing decks spaced vertically apart, a distributer operating above the upper deck to produce a plurality of lateral water jets directed upon the upper deck, and shielding means arranged to protect such jets against lateral deflection by the wind.

2. The combination as in claim 1 and wherein the upper deck consists of a series of overflow troughs arranged in relation to the jets so that each trough receives water at spaced apart points.

3. The combination as in claim 1 and wherein the wind shielding means consists of an inverted box covering the distributer and a substantial part of the upper deck and accommodating and protecting the jets.

4. The combination as in claim 1 and wherein the distributer consists of a single central water pipe located above the upper deck and within the shielding means, with jet orifices directed laterally toward both sides.

In testimony whereof, I have affixed my signature hereto.

EDWIN BURHORN.